(12) United States Patent
Izawa et al.

(10) Patent No.: US 11,119,484 B2
(45) Date of Patent: Sep. 14, 2021

(54) VACUUM CLEANER AND TRAVEL CONTROL METHOD THEREOF

(71) Applicant: TOSHIBA LIFESTYLE PRODUCTS & SERVICES CORPORATION, Kawasaki (JP)

(72) Inventors: Hirokazu Izawa, Aisai (JP); Yuuki Marutani, Nagakute (JP); Kota Watanabe, Owariasahi (JP)

(73) Assignee: TOSHIBA LIFESTYLE PRODUCTS & SERVICES CORPORATION, Kawasaki (JP)

( * ) Notice: Subject to any disclaimer, the term of this patent is extended or adjusted under 35 U.S.C. 154(b) by 265 days.

(21) Appl. No.: 16/346,657

(22) PCT Filed: Jun. 7, 2017

(86) PCT No.: PCT/JP2017/021204
§ 371 (c)(1),
(2) Date: May 1, 2019

(87) PCT Pub. No.: WO2018/083831
PCT Pub. Date: May 11, 2018

(65) Prior Publication Data
US 2020/0064838 A1    Feb. 27, 2020

(30) Foreign Application Priority Data
Nov. 2, 2016    (JP) .............. JP2016-215460

(51) Int. Cl.
*G05D 1/00*    (2006.01)
*A47L 9/28*    (2006.01)
(Continued)

(52) U.S. Cl.
CPC .......... *G05D 1/0088* (2013.01); *A47L 9/2826* (2013.01); *A47L 9/2852* (2013.01);
(Continued)

(58) Field of Classification Search
CPC . G06T 2207/10024; G06T 2207/20024; G06T 2207/20076; G06T 2207/20201;
(Continued)

(56) References Cited

U.S. PATENT DOCUMENTS 8,060,254 B2    11/2011 Myeong et al.
8,843,245 B2    9/2014 Choe et al.
(Continued)

FOREIGN PATENT DOCUMENTS

CN    101093503 A    12/2007
CN    201573208 U    9/2010
(Continued)

OTHER PUBLICATIONS

You et al., Development of a home service robot 'ISSAC', 2003, IEEE, p. 2630-2635 (Year: 2003).*
(Continued)

*Primary Examiner* — McDieunel Marc
(74) *Attorney, Agent, or Firm* — Oblon, McClelland, Maier & Neustadt, L.L.P.

(57) ABSTRACT

A vacuum cleaner includes a main casing, a driving wheel, a camera, a distance calculation part, a self-position estimation part, a mapping part, and a controller. The driving wheel enables the main casing to travel. The camera is disposed on the main casing to capture an image in traveling direction side of the main casing. The distance calculation part calculates a distance to an object positioned in the traveling direction side based on the captured image. The self-position estimation part calculates a position of the main casing based on the captured image. The mapping part generates a map of a traveling place by using three-dimensional data based on calculation results by the distance calculation part and the self-position estimation part. The controller controls an operation of the driving wheel based on the three-
(Continued)

dimensional data of the map generated by the mapping part, to make the main casing travel autonomously.

13 Claims, 7 Drawing Sheets

(51) Int. Cl.
  *A47L 11/40* (2006.01)
  *G05D 1/02* (2020.01)
(52) U.S. Cl.
  CPC ....... *A47L 11/4011* (2013.01); *A47L 11/4061* (2013.01); *A47L 11/4066* (2013.01); *G05D 1/0231* (2013.01); *G05D 1/0274* (2013.01); *G05D 1/0276* (2013.01); *A47L 2201/04* (2013.01); *G05D 2201/0203* (2013.01); *G05D 2201/0215* (2013.01)
(58) Field of Classification Search
  CPC . G06T 2207/30252; G06T 5/003; G06T 5/20; G06T 5/50; G06T 7/174; G06T 7/248; G06T 7/50; G06T 7/571; G06T 7/55; G06T 7/593; A47L 11/4011; A47L 11/4061; A47L 11/4066; A47L 2201/02; A47L 2201/04; A47L 9/28; A47L 9/2826; A47L 9/2852; A47L 9/2894; A47L 9/30; G01B 11/026; G01B 11/26; G01B 15/00; G01C 21/3837; G01S 13/878; G01S 15/08; G01S 15/42; G01S 17/08; G01S 2013/468; G06Q 10/06; G06Q 10/0637; G06Q 10/083; G08G 1/202; H04L 51/12; H04L 63/0823; H04L 63/083; H04N 5/2253; H04N 5/2256; H04N 5/2258; H04N 5/2354
  See application file for complete search history.

(56) References Cited

U.S. PATENT DOCUMENTS

| | | | |
|---|---|---|---|
| 9,411,338 | B2 | 8/2016 | Hanaoka et al. |
| 10,209,080 | B2 | 2/2019 | Lindhé et al. |
| 10,375,376 | B2* | 8/2019 | Yamamoto ............... G06T 7/593 |
| 10,394,794 | B2* | 8/2019 | Raghavan ............... H04L 63/08 |
| 2007/0293985 | A1 | 12/2007 | Myeong et al. |
| 2011/0202175 | A1* | 8/2011 | Romanov .................. B25J 5/00 |
| | | | 700/250 |
| 2011/0264305 | A1 | 10/2011 | Choe et al. |
| 2014/0324271 | A1 | 10/2014 | Oh et al. |
| 2015/0362921 | A1 | 12/2015 | Hanaoka et al. |
| 2016/0000289 | A1* | 1/2016 | Senoo ................... A47L 9/2852 |
| | | | 15/319 |
| 2016/0298970 | A1 | 10/2016 | Lindhe et al. |
| 2017/0360266 | A1 | 12/2017 | Izawa et al. |
| 2019/0053683 | A1* | 2/2019 | Watanabe ................. A47L 9/30 |
| 2019/0254490 | A1* | 8/2019 | Marutani ............. G05D 1/0251 |
| 2020/0033878 | A1* | 1/2020 | Watanabe ............ G05D 1/0251 |
| 2020/0057449 | A1* | 2/2020 | Watanabe ........... A47L 11/4061 |
| 2020/0100640 | A1* | 4/2020 | Marutani ............... A47L 9/2852 |
| 2020/0121147 | A1* | 4/2020 | Izawa .................. G05D 1/0246 |
| 2021/0059493 | A1* | 3/2021 | Watanabe ............. A47L 9/2805 |

FOREIGN PATENT DOCUMENTS

| | | |
|---|---|---|
| CN | 102053623 A | 5/2011 |
| CN | 103885443 A | 6/2014 |
| CN | 104536445 A | 4/2015 |
| CN | 104914865 A | 9/2015 |
| CN | 105849660 A | 8/2016 |
| CN | 106020201 A | 10/2016 |
| JP | 2003-180587 A | 7/2003 |
| JP | 2006-209644 A | 8/2006 |
| JP | 5426603 B2 | 2/2014 |
| JP | 2014-48842 A | 3/2014 |
| JP | 2014-194729 A | 10/2014 |
| JP | 2016-120168 A | 7/2016 |
| JP | 2017-143983 A | 8/2017 |
| JP | 2019-107083 A | 7/2019 |
| WO | WO 2012/008702 A2 | 1/2012 |
| WO | WO 2012/008702 A3 | 1/2012 |
| WO | WO 2016/129950 A1 | 8/2016 |
| WO | WO 2016/162305 A1 | 10/2016 |

OTHER PUBLICATIONS

Liu et al., Hardware and software integration for domestic stairs cleaning robot, 2011, IEEE, p. 663-670 (Year: 2011).*
Aravind et al., A Control Strategy for an Autonomous Robotic Vacuum Cleaner for Solar Panels, 2014, IEEE, p. 58-61 (Year: 2014).*
Lee et al., Intelligent scheduling and motion control for household vacuum cleaning robot system using simulation based, 2016, IEEE, p. optimization, 2015, IEEE, p. 1163-1171 (Year: 2015).*
International Search Report dated Sep. 5, 2017 in PCT/JP2017/021204 filed on Jun. 7, 2017.

* cited by examiner

VACUUM CLEANER AND TRAVEL CONTROL METHOD THEREOF

CROSS REFERENCE TO RELATED APPLICATIONS

The present application is a National Stage Application of PCT/JP2017/021204 filed on Jun. 7, 2017. The PCT application acclaims priority to Japanese Patent Application No. 2016-215460 filed on Nov. 2, 2016. All of the above applications are herein incorporated by reference.

FIELD

Embodiment described herein relates generally to a vacuum cleaner including a camera disposed on a main casing and a travel control method for the vacuum cleaner.

BACKGROUND

Conventionally, a so-called autonomous-traveling type vacuum cleaner (cleaning robot) which cleans a floor surface as a cleaning-object surface while autonomously traveling on the floor surface has been known.

In one of the technologies to perform efficient cleaning, such a vacuum cleaner generates a map by reflecting the size and shape of a room to be cleaned, obstacles and the like (through mapping), sets an optimum traveling route based on the generated map, and then performs traveling along the traveling route. This map is generated based on, for example, an image of a ceiling or the like captured by a camera disposed on an upper portion of a main casing.

In the case of generation of a map in such a manner, when the main casing travels, for example, an area under a bed, a table or the like where the main casing can travel, the camera captures images of only a lower surface side or the like of the bed or the table, not capturing images of the ceiling, and thus the accuracy of the generated map is lowered. The lowered accuracy in map generation also lowers the accuracy of the traveling route for the vacuum cleaner set based on the map, resulting in lowering the efficiency in cleaning.

CITATION LIST

Patent Literature

PTL 1: Japanese Patent Publication No. 5426603

SUMMARY OF INVENTION

Technical Problem

The technical problem of the present invention is to provide a vacuum cleaner capable of performing efficient cleaning with improved accuracy in map generation and a travel control method thereof.

Solution to Problem

A vacuum cleaner according to the present embodiment includes a main casing, a driving part, a camera, a distance calculator, a self-position estimator, a mapper, and a controller. The driving part enables the main casing to travel. The camera is disposed on the main casing, and captures an image in a side of traveling direction of the main casing. The distance calculator calculates a distance to an object positioned in the side of traveling direction based on the image captured by the camera. The self-position estimator calculates a position of the main casing based on the image captured by the camera. The mapper generates a map of a traveling place by use of three-dimensional data based on calculation results by the distance calculator and the self-position estimator. The controller controls operation of the driving part based on the three-dimensional data of the map generated by the mapper, so as to make the main casing travel autonomously.

DETAILED DESCRIPTION

Figure 1:
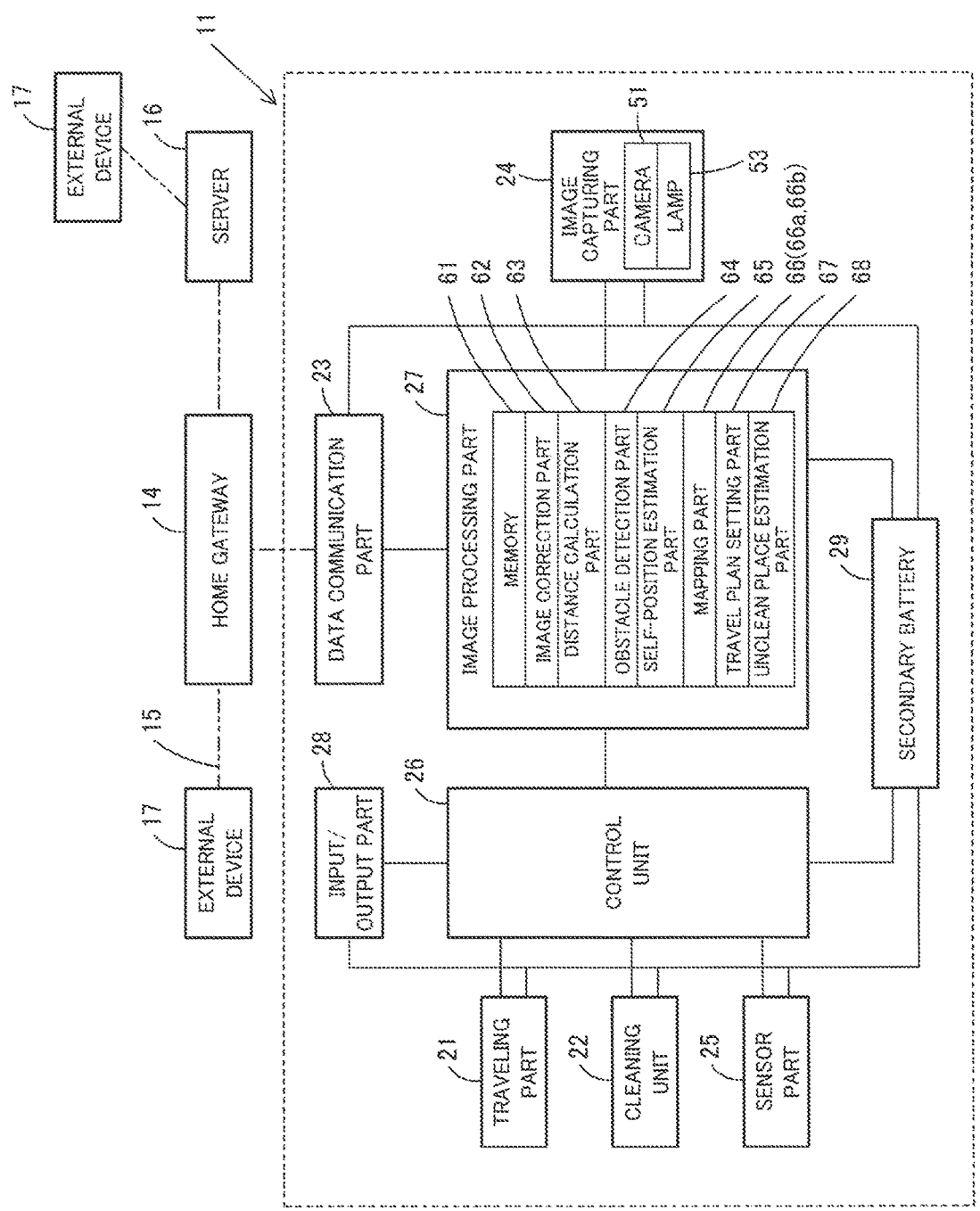
FIG. 1 is a block diagram showing a vacuum cleaner according to one embodiment.

Hereinbelow, the configuration of one embodiment will be described with reference to the accompanying drawings.

In FIG. 1 to FIG. 4, reference sign 11 denotes a vacuum cleaner as an autonomous traveler, and the vacuum cleaner 11 constitutes a vacuum cleaning apparatus (vacuum cleaner system) as an autonomous traveler device in combination with a charging device (charging table) 12 as a station device serving as a base station for charging the vacuum cleaner 11. Then, the vacuum cleaner 11 is, in the present embodiment, a so-called self-propelled robot cleaner (cleaning robot) which cleans a floor surface that is a cleaning-object surface as a traveling surface while autonomously traveling (being self-propelled to travel) on the floor surface. The vacuum cleaner 11 is enabled to perform wired or wireless communication with a general-purpose server 16 as data storage means (a data storage part), a general-purpose external device 17 which is a display terminal (an indication part), or the like via an (external) network 15 such as the Internet, by performing communication (signal transmission and reception) with a home gateway (router) 14 as relay means (a relay part) disposed in, for example, a cleaning area or the like by use of wired communication or wireless communication such as Wi-Fi (registered trademark) or Bluetooth (registered trademark).

The vacuum cleaner 11 includes a hollow main casing 20. The vacuum cleaner 11 also includes a traveling part 21. Further, the vacuum cleaner 11 includes a cleaning unit 22 for cleaning dust and dirt. The vacuum cleaner 11 also includes a data communication part 23 as information transmission means (an information transmission part) for performing wired or wireless communication via the network 15. In addition, the vacuum cleaner 11 includes an image capturing part 24 for capturing images. The vacuum cleaner 11 further includes a sensor part 25. The vacuum cleaner 11 also includes a control unit 26 as control means which is a controller. Further, the vacuum cleaner 11 includes an image processing part 27 as image processing means which is a graphics processing unit (GPU). The vacuum cleaner 11 also includes an input/output part 28 through which signals are input and output between the input/output part 28 and an external device. Then, the vacuum cleaner 11 includes a secondary battery 29 which is a battery for supplying electric power. In addition, the following description will be given on the assumption that a direction extending along the traveling direction of the vacuum cleaner 11 (main casing 20) is as a back-and-forth direction (directions of arrows FR and RR shown in FIG. 2), while a left-and-right direction (directions toward both sides) intersecting (orthogonally crossing) the back-and-forth direction is as a widthwise direction.

The main casing 20 is formed from a resin or the like, for example. The main casing 20 may be formed into, for example, a flat columnar shape (disc shape) or the like. The main casing 20 may also have a suction port 31 serving as a dust-collecting port on the lower portion thereof facing a floor surface.

The traveling part 21 includes driving wheels 34 as driving parts. The traveling part 21 also includes motors not shown in the figures, which are the driving means for driving the driving wheels 34. That is, the vacuum cleaner 11 includes the driving wheels 34 and the motors for driving the driving wheels 34. In addition, the traveling part 21 may include a swing wheel 36 or the like for swinging use.

The driving wheels 34 make the vacuum cleaner 11 (main casing 20) travel (autonomously travel) in an advancing direction and a retreating direction on a floor surface, that is, serve for traveling use. In the present embodiment, the driving wheels 34 are disposed, for example, in a pair respectively on the right and left sides of the main casing 20. As a driving part, a crawler or the like may be available instead of the driving wheels 34.

The motors are respectively disposed, for example, corresponding to the driving wheels 34. That is, in the present embodiment, the motors are disposed, for example, in a pair respectively on the right and left sides. Then, the motors are capable of driving each of the driving wheels 34 independently.

The cleaning unit 22 serves to remove dust and dirt on a cleaning-object part, for example, a floor surface, a wall surface and the like. The cleaning unit 22 has a function, for example, to collect and catch dust and dirt on a floor surface through the suction port 31, and/or to wipe a wall surface. The cleaning unit 22 may include at least one of an electric blower 40 which sucks dust and dirt along with air through the suction port 31, a rotary brush 41 as a rotary cleaner which is rotatably attached to the suction port 31 to scrape up dust and dirt, as well as a brush motor which rotationally drives the rotary brush 41, and side brushes 43 which are auxiliary cleaning means (an auxiliary cleaning part) as swinging-cleaning parts rotatably attached on the both sides of the main casing 20 on its front side or the like to scrape together dust and dirt, as well as a side brush motor which drives the side brushes 43. The cleaning unit 22 may also include a dust-collecting unit which communicates with the suction port 31 to collect dust and dirt.

The data communication part 23 is, for example, a wireless LAN device for transmitting and receiving various types of information with the external device 17 via the home gateway 14 and the network 15. In addition, in an example, the data communication part 23 may have an access point function to be used for performing wireless communication directly with the external device 17 not via the home gateway 14. A web server function, for example, may also be added to the data communication part 23.

The image capturing part 24 includes a camera 51 as image capturing means (an image-capturing-part main body). That is, the vacuum cleaner 11 includes the camera 51. The image capturing part 24 may include a lamp 53 as illumination means (an illumination part) for giving illumination for the camera 51. That is, the vacuum cleaner 11 may include the lamp 53.

The camera 51 is a digital camera which captures digital images of a forward direction corresponding to the traveling direction of the main casing 20, at each specified horizontal angle of view (for example 105° or the like) and at specified time intervals, for example, at a micro-time basis such as several tens of milliseconds or the like, or at a several-second basis or the like. The camera 51 may be of a single unit or a plurality of units. In the present embodiment, the cameras 51 are disposed in a pair respectively on the left and right sides. That is, the cameras 51 are disposed left and right apart from each other on the front portion of the main casing 20. Further, the cameras 51, 51 have their image capturing ranges (fields of view) overlapping with each other. Thus, the images captured by the cameras 51, 51 have their image capturing regions partially overlapping with each other in the left-and-right direction. It is noted that the images captured by the cameras 51 may be, for example, color images or black and white images of a visible light region, or infrared images. Further, the images captured by the cameras 51 are enabled to be compressed into a specified data format by, for example, the image processing part 27 or the like.

The lamp 53 serves to emit illuminating light for image capturing by the cameras 51. The lamp 53, in the present embodiment, is disposed at the intermediary position between the cameras 51, 51. The lamp 53 is designed to emit the light corresponding to the light wavelength region to be captured by the cameras 51. That is, the lamp 53 may emit light containing a visible light region, or may emit infrared light.

The sensor part 25 serves to perform sensing with respect to various types of information to support the traveling of the vacuum cleaner 11 (main casing 20). More specifically, the sensor part 25 serves to perform sensing with respect to, for example, a pit-and-bump condition (a step gap) on a floor surface, and/or, a wall, an obstacle or the like which hinders the traveling. That is, the sensor part 25 includes, for example, a step gap sensor, an obstacle sensor or the like such as an infrared sensor, a contact sensor or the like. In addition, the sensor part 25 may include, for example, a rotational speed sensor such as an optical encoder for detecting rotational speed of the each driving wheel 34 (the each motor) to detect a swing angle or progressional distance of the vacuum cleaner 11 (main casing 20), and a dust-and-dirt amount sensor such as an optical sensor for detecting a dust-and-dirt amount on a floor surface.

As the control unit 26, a microcomputer including, for example, a CPU which is a control means main body (control unit main body), a ROM, a RAM and the like is used. The control unit 26 includes an unshown travel control part to be electrically connected to the traveling part 21. The control unit 26 also includes an unshown cleaning control part to be electrically connected to the cleaning unit 22.

Further, the control unit 26 includes an unshown sensor connection part to be electrically connected to the sensor part 25. The control unit 26 also includes an unshown processing connection part to be electrically connected to the image processing part 27. Further, the control unit 26 includes an unshown input/output connection part to be electrically connected to the input/output part 28. That is, the control unit 26 is electrically connected to the traveling part 21, the cleaning unit 22, the sensor part 25, the image processing part 27, and the input/output part 28. The control unit 26 is also electrically connected to the secondary battery 29. The control unit 26 has, for example, a traveling mode for driving the driving wheels 34, that is, the motors to make the vacuum cleaner 11 (main casing 20) travel autonomously, a charging mode for charging the secondary battery 29 via the charging device 12, and a standby mode applied during a standby state.

The travel control part controls the operation of the motors of the traveling part 21. That is, the travel control part controls a magnitude and direction of current flowing through the motors to rotate the motors in a normal or reverse direction, thereby controlling the operation of the motors. By controlling the operation of the motors, the travel control part controls the operation of the driving wheels 34.

The cleaning control part controls the operation of the electric blower 40, the brush motor and the side brush motor of the cleaning unit 22. That is, the cleaning control part controls the conduction amounts of the electric blower 40, the brush motor and the side brush motor independently of one another, thereby controlling the operation of the electric blower 40, the brush motor (rotary brush 41) and the side brush motor (side brushes 43).

The sensor connection part serves to acquire a detection result done by the sensor part 25.

The processing connection part serves to acquire a setting result to be set based on the image processing done by the image processing part 27.

The input/output connection part serves to acquire a control command via the external device, and also to output to the input/output part 28 a signal to be output from the input/output part 28.

The image processing part 27 serves to perform image processing with respect to the images (original images) captured by the cameras 51. More specifically, the image processing part 27 extracts feature points from the images captured by the cameras 51 through the image processing to detect a distance to and a height of an obstacle, thereby generating a map of a cleaning area and estimating a current position of the vacuum cleaner 11 (main casing 20 (FIG. 2)). Then, the image processing part 27 is an image processing engine including, for example, a CPU which is an image-processing-means main body (image-processing-part main body), a ROM, a RAM and the like. The image processing part 27 includes an unshown camera control part for controlling the operation of the cameras 51. The image processing part 27 also includes an unshown illumination control part for controlling the operation of the lamp 53. Thus, the image processing part 27 is electrically connected to the image capturing part 24. Further, the image processing part 27 includes a memory 61 as storage means (a storage section). That is, the vacuum cleaner 11 includes the memory 61. The image processing part 27 also includes an image correction part 62 for generating a correction image by correcting the original images captured by the cameras 51. That is, the vacuum cleaner 11 includes the image correction part 62. The image processing part 27 further includes a distance calculation part 63 as distance calculation means for calculating a distance to an object positioned in a side of traveling direction based on an image. That is, the vacuum cleaner 11 includes the distance calculation part 63 as distance calculation means. The image processing part 27 also includes an obstacle detection part 64 as obstacle detection means for determining an obstacle based on the distance to an object calculated by the distance calculation part 63. That is, the vacuum cleaner 11 includes the obstacle detection part 64 as obstacle detection means. The image processing part 27 also includes a self-position estimation part 65 as self-position estimation means for estimating a self-position of the vacuum cleaner 11 (main casing 20). That is, the vacuum cleaner 11 includes the self-position estimation part 65 as self-position estimation means. Further, the image processing part 27 includes a mapping part 66 as mapping means for generating a map of a cleaning area which is a traveling place. That is, the vacuum cleaner 11 includes the mapping part 66 as mapping means. The image processing part 27 also includes a travel plan setting part 67 as travel plan setting means for setting a travel plan (traveling route) of the vacuum cleaner 11 (main casing 20). That is, the vacuum cleaner 11 includes the travel plan setting part 67 as travel plan setting means. Then, the image processing part 27 includes an unclean place estimation part 68 as unclean place estimation means for estimating a place not having been cleaned by the vacuum cleaner 11 (main casing 20). That is, the vacuum cleaner 11 includes the unclean place estimation part 68 as unclean place estimation means.

The camera control part includes a control circuit for controlling, for example, the operation of shutters of the cameras 51, and controls the operation of the shutters at specified time intervals, thereby capturing images by the cameras 51 at specified time intervals.

The illumination control part controls the turn-on and -off operation of the lamp 53 via, for example, a switch or the like.

In addition, the camera control part and the illumination control part may be configured as camera control means (an camera control part) separated from the image processing part 27, or may be disposed, for example, in the control unit 26.

The memory 61 stores various types of data, for example, image data captured by the cameras 51, a map generated by the mapping part 66, and the like. A non-volatile memory, for example, a flash memory or the like serves as the memory 61, which holds various types of data stored regardless of whether the vacuum cleaner 11 is powered on or off.

The image correction part 62 performs initial image processing such as correction of lens distortion, noise elimination, contrast-adjusting, and matching the centers of images, with respect to the original images captured by the cameras 51.

Figure 5:
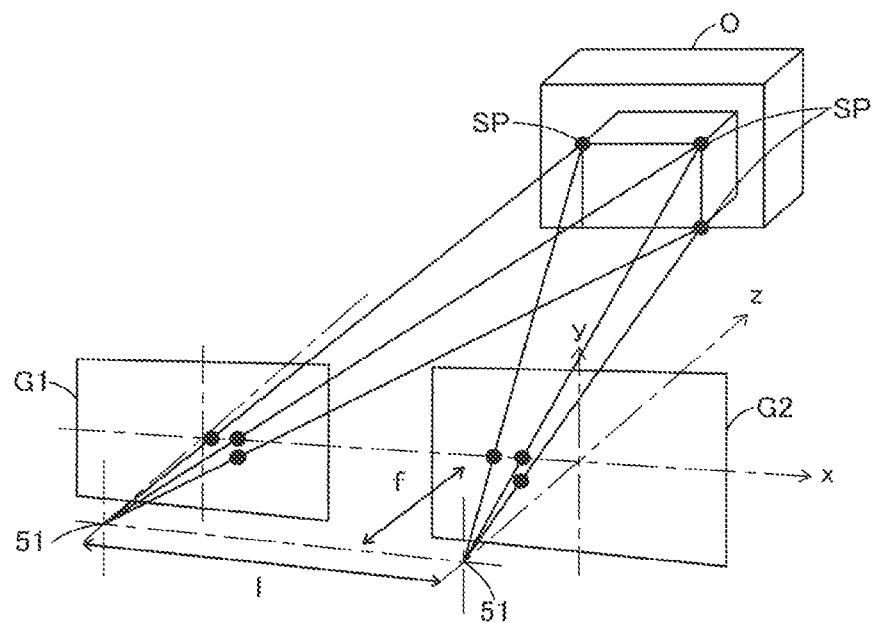
FIG. 5 is an explanatory view schematically showing a method for calculating a distance to an object by use of a camera of the above vacuum cleaner.

The distance calculation part 63 calculates, by a known method, a distance (depth) to and three-dimensional coordinates of an object (feature points) based on a distance between the cameras 51, and the images captured by the cameras 51, that is, in the present embodiment, the correction images corrected by the image correction part 62 with respect to the images captured by the cameras 51. That is, as shown in FIG. 5, by applying triangulation based on, for example, a depth f of the cameras 51, a distance (parallax) between the cameras 51 and an object (feature points) in an image G1 and an image G2 captured by the cameras 51, and a distance l between the cameras 51, the distance calculation part 63 detects pixel dots indicating an identical position in individual images captured by the cameras 51 (correction images processed by the image correction part 62 (FIG. 1)), and calculates the angles of the pixel dots in the up-and-down direction, the left-and-right direction and the back-and-forth direction, thereby calculating the distance and height of the position from the cameras 51 and also the three-dimensional coordinates of an object O (feature points SP) based on those angles and the distance between the cameras 51. Therefore, in the present embodiment, the images captured by the plurality of cameras 51 preferably overlap in the ranges with each other as much as possible. The distance calculation part 63 shown in FIG. 1 may generate a distance image (parallax image) indicative of the calculated distance to the object. The distance image is generated through indication of each of the calculated pixel-dot-basis distances that is converted into a visually discernible gradation level such as of brightness, color tone or the like on a specified dot basis, for example, a one-dot basis or the like. Accordingly, the distance image is acquired by, as it were, visualizing a mass of distance information (distance data) of objects positioned within the image capturing ranges of the cameras 51 located forward in the traveling direction of the vacuum cleaner 11 (main casing 20) shown in FIG. 2. In addition, the feature points are enabled to be extracted through, for example, edge detection or the like, with respect to the images corrected by the image correction part 62 shown in FIG. 1 or the distance image. Any of known methods is available as the edge detection method.

The obstacle detection part 64 detects an obstacle based on the images captured by the cameras 51. More specifically, the obstacle detection part 64 determines whether or not the object calculated by the distance calculation part 63 with respect to a distance is an obstacle. That is, the obstacle detection part 64 extracts a part in a certain image range based on the calculated distance to the object by the distance calculation part 63, and compares the distance to the captured object in the image range with a set distance corresponding to a threshold value previously set or variably set, thereby determining as an obstacle the object positioned at the set distance or closer (at the distance from the vacuum cleaner 11 (main casing 20 (FIG. 2)). The image range described above is set, for example, in accordance with the vertical and lateral sizes of the vacuum cleaner 11 (main casing 20) shown in FIG. 2. That is, the image range is set laterally and vertically so that the vacuum cleaner 11 (main casing 20) traveling linearly as is will be brought into contact with the image range.

The self-position estimation part 65 shown in FIG. 1 serves to determine a self-position of the vacuum cleaner 11 and existence of an object as an obstacle based on the three-dimensional coordinates of the feature points of an object calculated by the distance calculation part 63. The mapping part 66 generates a map indicative of positional relations and a height of an object (obstacle) or the like positioned in the cleaning area where the vacuum cleaner 11 (main casing 20 (FIG. 2)) is positioned, based on the three-dimensional coordinates of the feature points calculated by the distance calculation part 63. That is, a known SLAM (simultaneous localization and mapping) technology is available for the self-position estimation part 65 and the mapping part 66.

The mapping part 66 serves to generate a map indicative of a traveling place by use of three-dimensional data based on the calculation results by the distance calculation part 63 and the self-position estimation part 65. In the present embodiment, the mapping part 66 includes a first mapping part 66a serving as first mapping means and a second mapping part 66b serving as second mapping means.

Figure 2:
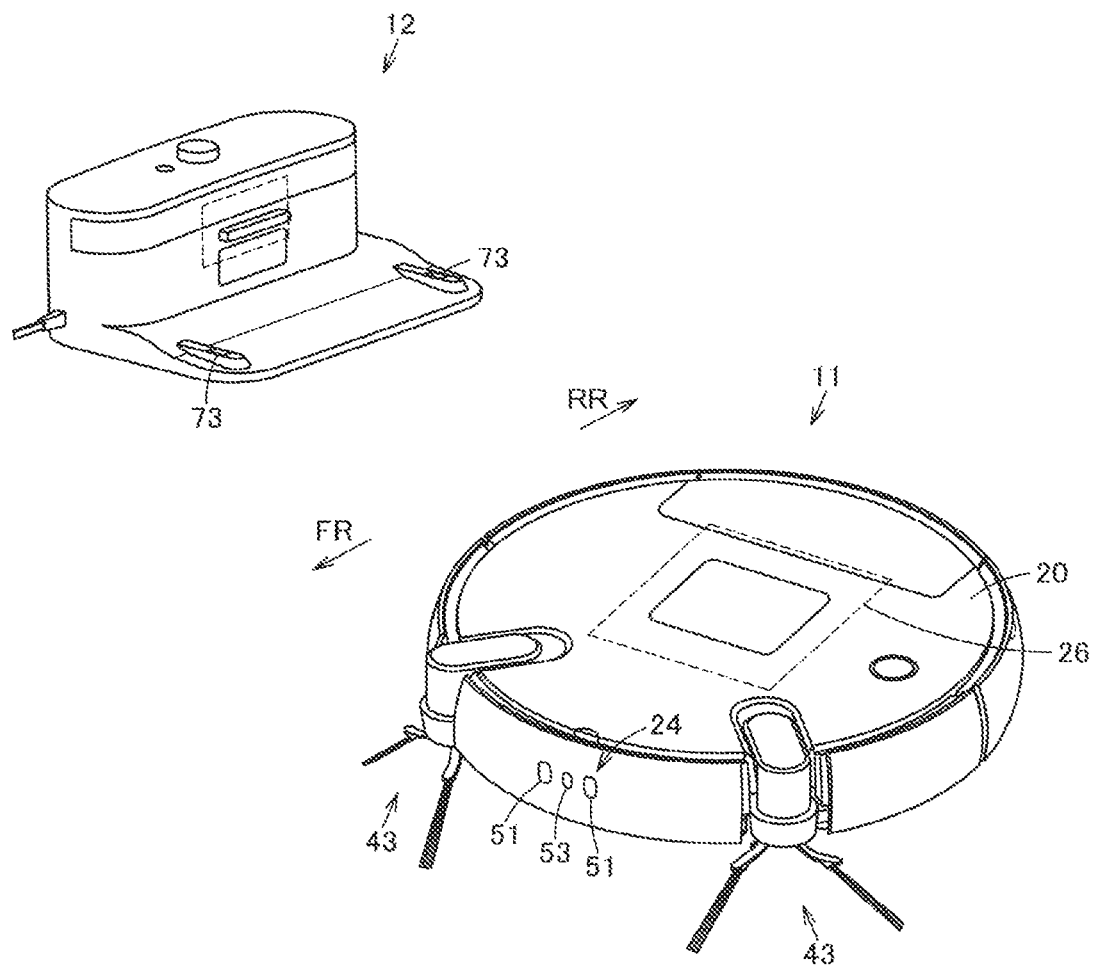
FIG. 2 is a perspective view showing a vacuum cleaner system including the above vacuum cleaner.
Figure 3:
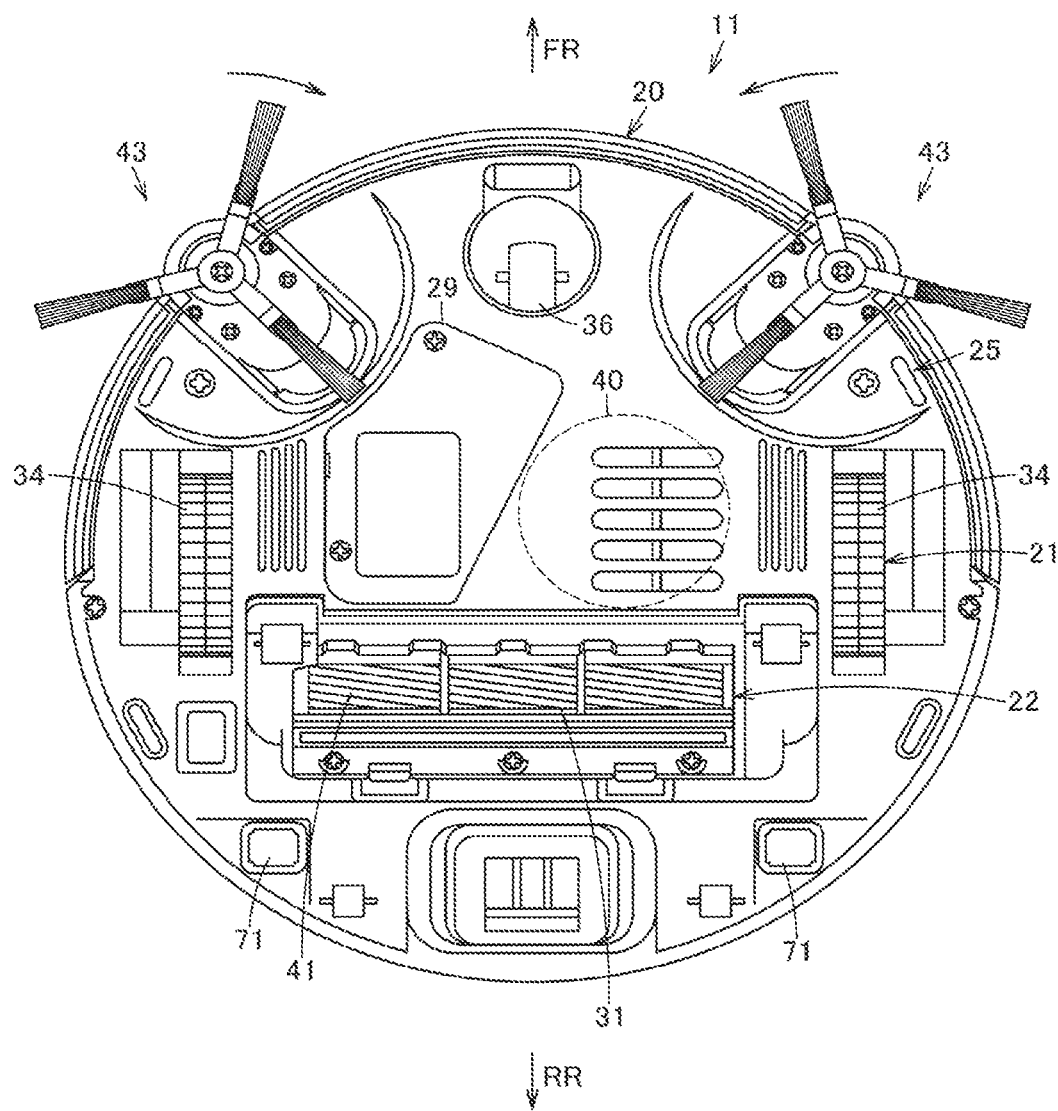
FIG. 3 is a plan view showing the above vacuum cleaner as viewed from below.

The first mapping part 66a serves to generate a simple map by use of any method based on the images captured by the cameras 51, that is, the three-dimensional data of an object calculated by the distance calculation part 63. In the present embodiment, in an example, the first mapping part 66a generates a simple map based on the images captured by the cameras 51 while the control unit 26 is performing travel control to the main casing 20 (FIG. 2). More specifically, in an example, the first mapping part 66a generates a simple map by use of an x-axis component (lateral component) and a z-axis component (longitudinal component) in the three-dimensional coordinates of the feature points calculated by the distance calculation part 63, based on the images (the correction images corrected by the image correction part 62) which are captured by the cameras 51 while the control unit 26 performs travel control so that the main casing 20 (FIG. 2) swings at a specified position. In an example, the first mapping part 66a generates a simple map at the time of starting cleaning. At this time, the first mapping part 66a generates a simple map in the case where the map is not stored in the memory 61. That is, in the case where the map is stored in the memory 61, mapping by the first mapping part 66a is not required.

The second mapping part 66b serves to additionally reflect to the map the images captured by the cameras 51, that is, the three-dimensional data of an object calculated by the distance calculation part 63. That is, the second mapping part 66b adds detailed information with respect to a two-dimensional position and a height of an object (obstacle) or the like positioned in the cleaning area where the vacuum cleaner 11 (main casing 20 (FIG. 2)) is disposed, by use of a y-axis component (vertical component) in the three-dimensional coordinates of the feature points calculated by the distance calculation part 63, to the simple map simply generated by the first mapping part 66a, or to the map stored in the memory 61. The detailed information includes, for example, a thickness of a carpet, a height to the lower part of a bed, and the like. In the present embodiment, the map generated by the mapping part 66 refers to the data developed to the memory 61 or the like. That is, the map data include three-dimensional data, that is, two-dimensional arrangement position data and height data of an object. Also, the map data may further include traveling track data indicative of the traveling track of the vacuum cleaner 11 (main casing 20 (FIG. 2)) at the time of cleaning.

The travel plan setting part 67 sets an optimum traveling route based on the map generated by the mapping part 66 and the self-position estimated by the self-position estimation part 65. Here, as an optimum traveling route to be generated, a route which can provide efficient traveling (cleaning) is set, such as a route which can provide the shortest traveling distance for traveling in an area enabled to be cleaned in the map (an area excluding a part where traveling is impossible due to an obstacle, a step gap or the like), for example, a route by which the vacuum cleaner 11 (main casing 20 (FIG. 2)) travels linearly as long as possible (by which directional change is least required), a route by which contact with an object as an obstacle is less, or a route by which the number of times of redundantly traveling the same location is the minimum, or the like. Further, when setting the traveling route, the travel plan setting part 67 may, by grasping the shape and size of the cleaning area based on the map (simple map), set the first position to be cleaned, check the capacity of the secondary battery 29 to be estimated required for cleaning, and/or divide the cleaning area. In addition, in the present embodiment, the traveling route set by the travel plan setting part 67 refers to the data (traveling route data) developed to the memory 61 or the like.

The unclean place estimation part 68 serves to estimate the place not having been cleaned based on the three-dimensional data and the traveling track data of the main casing 20 (FIG. 2). That is, the unclean place estimation part 68 compares the traveling track data of the main casing 20 (FIG. 2) with the three-dimensional data indicative of a map, to estimate as the place not having been cleaned the position where the traveling track has not been formed in the area where the vacuum cleaner 11 (main casing 20 (FIG. 2)) can travel. The place not having been cleaned is enabled to be reflected to the map generated by the mapping part 66.

The input/output part 28 serves to acquire the control command transmitted from an unshown external device such as a remote control, and/or the control command input from input means (an input part) such as a switch or a touch panel which are disposed on the main casing 20 (FIG. 2), and also to transmit a signal to, for example, the charging device 12 (FIG. 2) or the like. The input/output part 28 includes unshown transmission means (a transmission part), for example, an infrared ray emitting element or the like, which transmits a radio signal (infrared signal) to, for example, the charging device 12 (FIG. 2) or the like, and unshown reception means (a reception part), for example, a phototransistor or the like, which receives a radio signal (infrared signal) from the charging device 12 (FIG. 2), a remote control or the like.

The secondary battery 29 serves to supply electric power to the traveling part 21, the cleaning unit 22, the data communication part 23, the image capturing part 24, the sensor part 25, the control unit 26, the image processing part 27, the input/output part 28, and the like. In addition, the secondary battery 29 is electrically connected to charging terminals 71 (FIG. 3) serving as connection parts exposed, for example, on the lower portion of the main casing 20 (FIG. 2). With the charging terminals 71 (FIG. 3) electrically and mechanically connected to the charging device 12 (FIG. 2) side, the secondary battery 29 is charged via the charging device 12 (FIG. 2).

The charging device 12 shown in FIG. 2 is equipped with a charging circuit, for example, a constant current circuit or the like. Further, the charging device 12 includes terminals for charging 73 for charging the secondary battery 29 (FIG. 1). The terminals for charging 73 which are electrically connected to the charging circuit are mechanically and electrically connected to the charging terminals 71 (FIG. 3) of the vacuum cleaner 11 having returned to the charging device 12.

Figure 4:
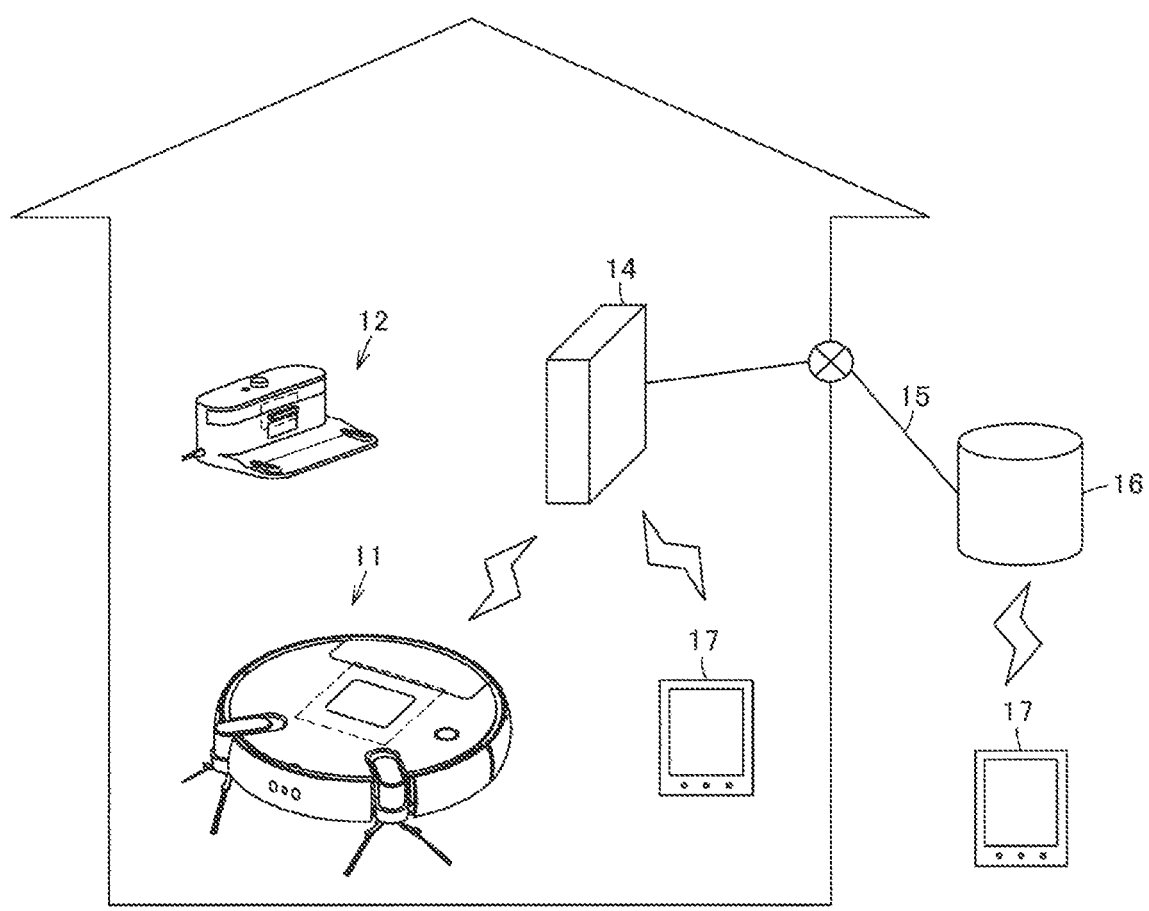
FIG. 4 is an explanatory view schematically showing the vacuum cleaner system including the above vacuum cleaner.

The home gateway 14 shown in FIG. 4, which is also called an access point or the like, is installed inside a building and connected to the network 15, for example, by wire.

The server 16 is a computer (cloud server) connected to the network 15, and is capable of storing various types of data.

The external device 17 is a general-purpose device, for example, a PC (tablet terminal (tablet PC)), a smartphone (mobile phone) or the like, which is capable of, inside a building, performing wired or wireless communication with the network 15, for example, via the home gateway 14, and outside a building, performing wired or wireless communication with the network 15. The external device 17 has at least an indication function to indicate images.

Next, the operation of the above-described embodiment is described with reference to the drawings.

In general, the work of the vacuum cleaning apparatus is roughly divided into cleaning work in which the vacuum cleaner 11 performs cleaning, and charging work in which the charging device 12 charges the secondary battery 29. The charging work is implemented by a known method using a charging circuit contained in the charging device 12. Therefore, only the cleaning work is described. In addition, image capturing work in which the cameras 51 capture images of a specified object in response to an instruction from the external device 17 or the like may be included separately.

First, the cleaning work is roughly described from the start to the end. The vacuum cleaner 11 undocks from the charging device 12 when starting cleaning, and generates a simple map by the first mapping part 66a based on the images captured by the cameras 51 in the case where the map is not stored in the memory 61. Then, the cleaning unit 22 performs cleaning while the control unit 26 controls the vacuum cleaner 11 (main casing 20) so that the vacuum cleaner 11 (main casing 20) travels along the traveling route set by the travel plan setting part 67 based on the simple map. In the case where the map is stored in the memory 61, the cleaning unit 22 performs cleaning while the control unit 26 controls the vacuum cleaner 11 (main casing 20) so that the vacuum cleaner 11 (main casing 20) travels along the traveling route set by the travel plan setting part 67 based on the map. During the cleaning, a two-dimensional arrangement position and a height of an object are detected by the second mapping part 66b based on the images captured by the cameras 51, and then reflected to the map for storage in the memory 61. After the cleaning is finished, the control unit 26 performs travel control so that the vacuum cleaner 11 (main casing 20) returns to the charging device 12. After the vacuum cleaner 11 (main casing 20) returns to the charging device 12, the procedure moves to the charging work for the secondary battery 29 at a specified timing.

In more detail, in the vacuum cleaner 11, the control unit 26 is switched over from the standby mode to the traveling mode, at a timing of, for example, arrival of a preset cleaning start time, or reception by the input/output part 28 of the control command for cleaning start transmitted from a remote control or the external device 17, and then the control unit 26 (a travel control part) drives the motors (driving wheels 34) to make the vacuum cleaner 11 move from the charging device 12 by a specified distance.

Next, the vacuum cleaner 11 determines whether or not the map is stored in the memory 61 by referring to the memory 61. In the case where the map is not stored in the memory 61, a simple map of the cleaning area is generated by the first mapping part 66a of the mapping part 66, and then an optimum traveling route is generated based on the simple map by the travel plan setting part 67.

In generation of the simple map, in overview, the vacuum cleaner 11 acquires two-dimensional arrangement position data and height data of an object (wall, obstacle or the like) based on the images captured by the cameras 51, while swinging (pivot-turning) at a position away from the charging device 12, and then generates the simple map (a simple map generation mode). Then, after the simple map including the whole cleaning area is generated, the procedure finishes the simple map generation mode and is switched over to a cleaning mode which is described later.

Figure 6A:
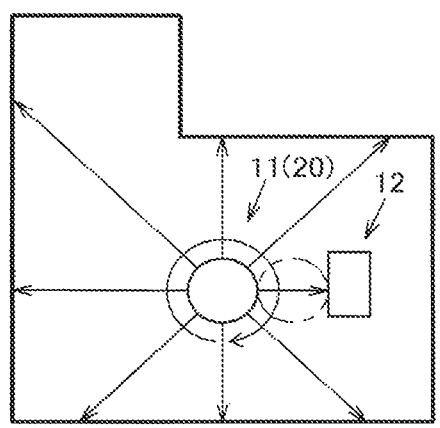
FIG. 6A is an explanatory view schematically showing operation of generating a simple map by a first mapper of the above vacuum cleaner.

More specifically, for example as shown in FIG. 6A, after the vacuum cleaner 11 (main casing 20) in a state being connected to the charging device 12 moves from the charging device 12 by a specified distance, images are captured by the cameras 51 (FIG. 2) during swinging (pivot-turning) by a specified angle. This swing angle of the vacuum cleaner 11

Figure 6B:
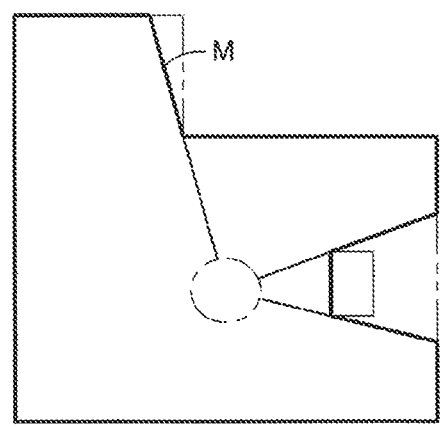
FIG. 6B is an explanatory view schematically showing the simple map generated based on FIG. 6A.

(main casing 20) is set to be, for example, 360 degrees. Then, a map M (shown by a thick line in the figure) is generated as shown in FIG. 6B through recognition of a position (two-dimensional coordinates) of an obstacle based on a distance from the vacuum cleaner 11 (main casing 20) to a captured object (feature points) and a current position of the vacuum cleaner 11 (main casing 20). In this case, the position in a dead angle to the cameras 51 (FIG. 2) is processed as an obstacle or a wall.

On the other hand, in the case where the map is previously stored in the memory 61, an optimum traveling route is generated by the travel plan setting part 67 based on the map stored in the memory 61 without generation of the simple map.

Then, the vacuum cleaner 11 performs cleaning while autonomously traveling in the cleaning area along the traveling route generated by the travel plan setting part 67 (cleaning mode). In the cleaning mode, for example, by the electric blower 40, the brush motor (rotary brush 41) or the side brush motor (side brushes 43) driven by the control unit 26 (cleaning control part), the cleaning unit 22 collects dust and dirt existing on a floor surface to a dust-collecting unit through the suction port 31.

In the autonomous traveling, in overview, the vacuum cleaner 11 repeats, while operating the cleaning unit 22, the operation to capture forward images in the traveling direction by the cameras 51 during traveling along the traveling route, to perform periphery sensing by the sensor part 25 as well as detecting an object as an obstacle by the obstacle detection part 64, and to periodically estimate the self-position by the self-position estimation part 65. At this time, the second mapping part 66*b* of the mapping part 66 completes the map by reflecting detail information (height data) of feature points based on the images captured by the cameras 51. The traveling track data of the vacuum cleaner 11 (main casing 20) may also be generated based on the estimation of the self-position of the vacuum cleaner 11 (main casing 20) by the self-position estimation part 65.

The vacuum cleaner 11 returns to the charging device 12 after traveling the entire set traveling route. The control unit 26 is switched over from the traveling mode to the charging mode for charging the secondary battery 29 at a proper timing, such as just after the returning, when a specified time elapses after the returning, or at a specified time.

Figure 7:
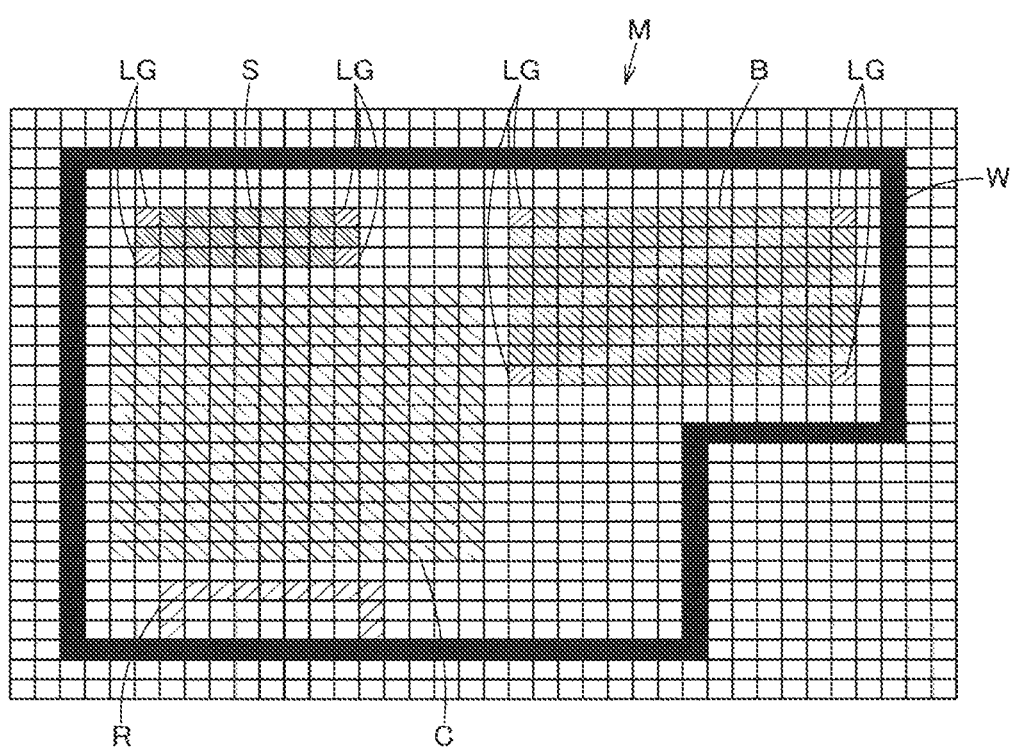
FIG. 7 is an explanatory view showing an example of a map generated by the mapper of the above vacuum cleaner.

In addition, the completed map M is stored in such a manner that as visually shown in FIG. 7, the cleaning area (a room) is divided into meshes each having a specified-sized quadrilateral shape (square shape) or the like and each of the meshes is related to the height data. A height of an object is acquired by the distance calculation part 63 based on the images captured by the cameras 51. In an example, the map M shown in FIG. 7 includes a carpet C as an obstacle generating a projecting step gap on a floor surface, a bed B as an obstacle having a height allowing the vacuum cleaner 11 (main casing 20) to travel there below, a sofa S as an obstacle having a height allowing the vacuum cleaner 11 (main casing 20) to travel there below, a shelf R as an obstacle not allowing the vacuum cleaner 11 (main casing 20) to travel, leg parts LG of the bed B and the sofa S as obstacles, a wall W as an obstacle surrounding the cleaning area and not allowing the vacuum cleaner 11 (main casing 20) to travel, and the like. The map data are stored in the memory 61, but may be sent to the server 16 for storage via the data communication part 23 through the network 15, or may be sent to the external device 17 for storage in a memory of the external device 17.

Then, in accordance with the above-described embodiment, a distance to an object positioned in the side of traveling direction is calculated based on the images captured by the cameras 51, and a position of the main casing 20 is calculated based on the images captured by the cameras 51. Further, based on these calculation results, a map of the traveling place is generated by use of three-dimensional data, and then based on the three-dimensional data of the generated map the operation of the driving wheels 34 (motors) is controlled so that the main casing 20 is autonomously made travel. Thereby the accuracy in map generation is improved and the determination of an obstacle for traveling is facilitated based on the three-dimensional data. This enables to, as a result, finely control the traveling of the vacuum cleaner 11 (main casing 20) every part according to the cleaning area, and thus to perform efficient cleaning.

Specifically, the three-dimensional data which include two-dimensional arrangement position data and height data of an object facilitate determination regarding, for example, whether or not the vacuum cleaner 11 (main casing 20) can travel under a bed, whether or not the vacuum cleaner 11 (main casing 20) can travel over a step gap such as of a carpet, or the like.

Thus, in an example, in the case where a carpet is determined to be laid on a floor surface, a cleaning method for carpet surface which is different from a cleaning method for non-carpet surface is performed, thereby enabling to improve cleaning performance. Specifically, on a non-carpet surface, for example, the suction force by the electric blower 40 is lowered to suppress power consumption, thus enabling to prolong the service life of the secondary battery 29, while on a carpet surface, the control unit 26 performs control to slow down the traveling speed and increase the suction force by the electric blower 40, thus enabling to more easily remove dust and dirt attached on the carpet by the cleaning unit 22.

The mapping part 66 includes the first mapping part 66*a* for simply generating a map based on the images captured by the cameras 51, and the second mapping part 66*b* for additionally reflecting to the map the three-dimensional data of the object captured by the cameras 51. Since this allows the shape and size of the cleaning area to be grasped based on the simply generated map when the travel plan setting part 67 sets the traveling route by use of the simple map at an early step or other case, various types of determination are easily performed, with regard to such as setting the first position to be cleaned, checking the capacity of the secondary battery 29 to be estimated required for cleaning, and/or dividing the cleaning area. In addition, as the cleaning is continued, the map is being improved in accuracy finally to become a highly accurate map, which is effectively available at the next and following cleaning.

The first mapping part 66*a* is capable of easily generating the simple map for a short period of time because the control unit 26 controls the operation of the driving wheels 34 (motors) so as to swing the main casing 20, and generates the simple map based on the images captured by the cameras 51.

Inclusion of the memory 61 for storing map data allows the traveling route or the like to be set easily at the time of the second and following cleaning based on the map generated at the previous cleaning, thus allowing immediate start for cleaning.

Then, in the present embodiment, the map generated by the above-described mapping part 66 is applicable as described below as an example.

In an example, the data communication part 23 transmits the map data via the network 15 to the external device 17 connected to the network 15, which allows the map to be indicated on the external device 17 real time, for example.

The data communication part 23 also transmits and receives the map data via the network 15 with the server 16 connected to the network 15, which allows the map generated at the time of previous cleaning to be stored in the server 16, and allows the map to be read out from the server 16 when required. This allows the configuration of the vacuum cleaner 11, for example, without the memory 61.

Further, inclusion of the three-dimensional data and the traveling track data of the main casing 20 in the map data allows the map reflecting the three-dimensional data of an object and the traveling track data of the main casing 20, to be indicated on the external device 17 real time.

Then, the unclean place estimation part 68 estimates the place not having been cleaned based on the three-dimensional data and the traveling track data of the main casing 20, thereby allowing, for example, the place not having been cleaned to be indicated on the map.

Especially, the cameras 51 capture the images of the place estimated not having been cleaned, more specifically, the control unit 26 controls the operation of the driving wheels 34 (motors) so that the vacuum cleaner 11 (main casing 20) travels to the position where the cameras 51 can capture images of the place not having been cleaned, thereby enabling to clearly and visually inform an owner of the place not having been cleaned.

Figure 8:
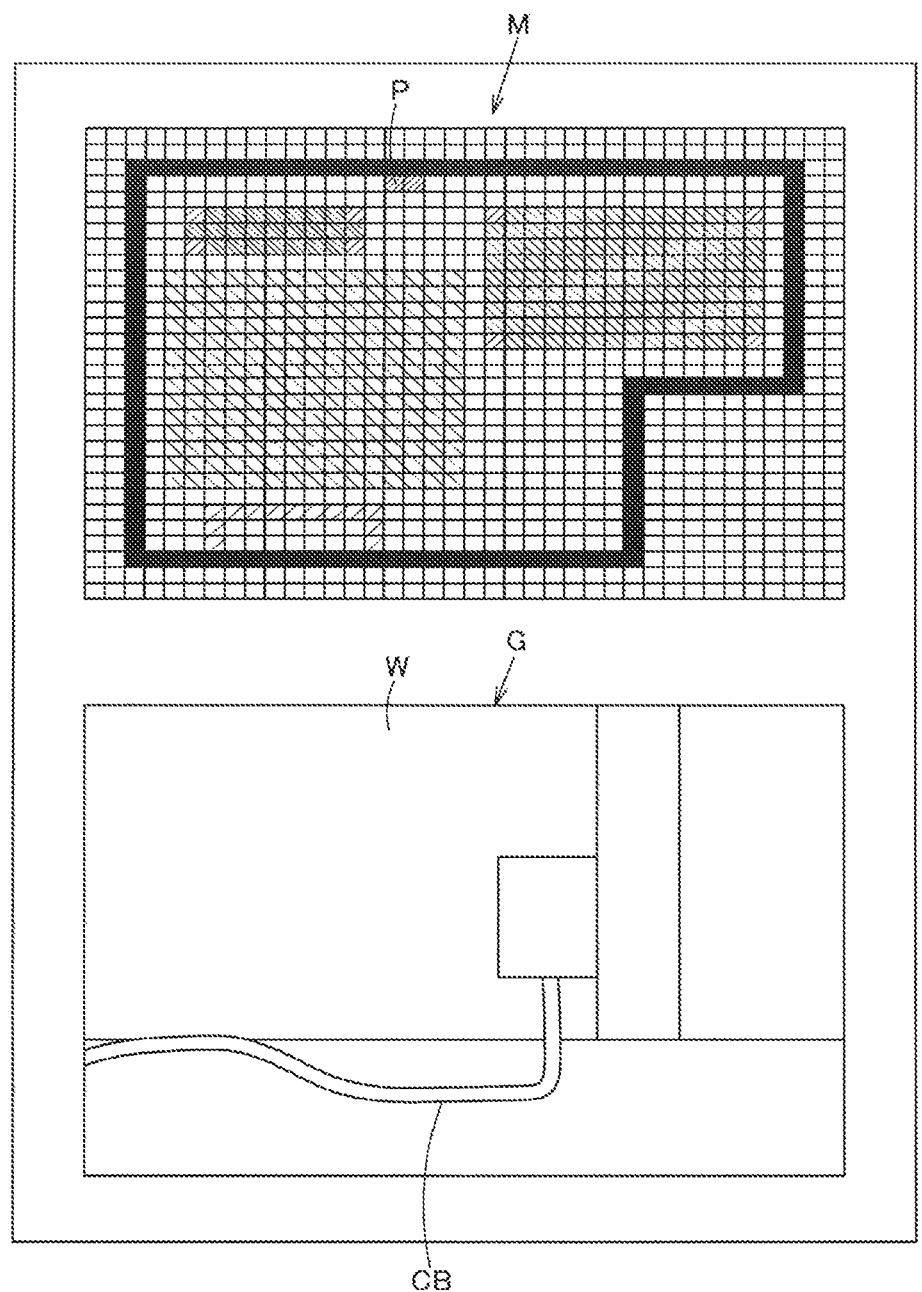
FIG. 8 is an explanatory view schematically showing an example indication screen of a display terminal for indicating the above map and a place not having been cleaned.

Then, the data communication part 23 transmits the estimation result via the network 15, thereby allowing the map M reflecting a place P not having been cleaned and a concrete image G of the place not having been cleaned to be respectively indicated, in an example as shown in FIG. 8, on the external device 17 connected to the network 15. This example includes the place P not having been cleaned (the place where the vacuum cleaner 11 (main casing 20) has never approached in traveling) which is surrounded by, for example, a wall W and a cable CB projecting from the wall W along the floor surface. This enables to urge an owner to voluntary participation in cleaning, such as by cleaning the place not having been cleaned by the owner, or by tidying up the cleaning area so that the vacuum cleaner 11 can autonomously clean the place at the next cleaning.

The control unit 26 controls the operation of the driving wheels 34 (motors) so that the vacuum cleaner 11 (main casing 20) travels based on the control command transmitted from the external device 17, thereby enabling to arbitrarily and remotely operate the vacuum cleaner 11 (main casing 20), when an owner inputs the control command or the like to make the vacuum cleaner 11 (main casing 20) travel to the desired place, for example by referring to the map indicated on the external device 17.

Specifically, in the case where the control command includes travel control information with which the control unit 26 controls the operation of the driving wheels 34 (motors) so as to make the main casing 20 travel to the place desired for traveling on the map, an owner can give an instruction to urge the vacuum cleaner 11 (main casing 20) to travel to the desired place, by a simple operation of just indicating the desired place on the map indicated on the external device 17, for example, by tapping the desired place on the map or the like.

Further, in the case where the control command includes travel control information with which the control unit 26 controls the operation of the driving wheels 34 (motors) so as to prevent the main casing 20 from traveling to the place not desired for traveling on the map, an owner can give an instruction to urge the vacuum cleaner 11 (main casing 20) not to travel to the desired place, by a simple operation of just indicating the desired place on the map indicated on the external device 17, for example, by drawing a line or the like.

In addition, in the above-described embodiment, the distance calculation part 63 calculates three-dimensional coordinates with respect to feature points by use of the images captured respectively by the plurality (pair) of cameras 51. However, the three-dimensional coordinates of feature points may also be calculated by use of a plurality of images captured in time-division manner by one unit of camera 51, while the main casing 20 is traveling.

While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the inventions.

(1) A travel control method for a vacuum cleaner, comprising the steps of capturing an image in a side of traveling direction of a main casing by a camera, calculating a distance to an object positioned in the side of traveling direction based on the captured image, as well as calculating a position of the main casing based on the captured image, generating a map of a traveling place by use of three-dimensional data based on the calculation results, and autonomous traveling based on the three-dimensional data of the map.

(2) The travel control method for the vacuum cleaner according to (1), wherein the three-dimensional data include two-dimensional arrangement position data and height data of an object.

(3) The travel control method for the vacuum cleaner according to (1), comprising the steps of simply generating a map based on the image captured by the camera, and additionally reflecting to the map the three-dimensional data of an object captured by the camera to generate three-dimensional data of the map.

(4) The travel control method for the vacuum cleaner according to (3), comprising the step of generating the simple map based on the image captured by the camera during swinging by the main casing.

(5) The travel control method for the vacuum cleaner according to (1), comprising the step of storing map data in a memory.

(6) The travel control method for the vacuum cleaner according to (1), comprising the step of transmitting map data via a network to a display terminal.

(7) The travel control method for the vacuum cleaner according to (6), comprising the step of transmitting and receiving the map data via the network to a server connected to the network.

(8) The travel control method for the vacuum cleaner according to (1), wherein the map data include the three-dimensional data and traveling track data of the main casing.

(9) The travel control method for the vacuum cleaner according to (8), comprising the step of estimating a place not having been cleaned based on the three-dimensional data and the traveling track data of the main casing.

(10) The travel control method for the vacuum cleaner according to (9), comprising the step of capturing an image of the estimated place not having been cleaned by the camera.

(11) The travel control method for the vacuum cleaner according to (9), comprising the step of transmitting a result regarding the estimated place not having been cleaned to a network by communication.

(12) The travel control method for the vacuum cleaner according to (1), comprising the step of making the main casing travel based on a control command transmitted from an external device.

(13) The travel control method for the vacuum cleaner according to (12), wherein the control command includes travel control information to be used for making the main casing travel to a place desired for traveling on the map.

(14) The travel control method for the vacuum cleaner according to (12), wherein the control command includes travel control information to be used for preventing the main casing from traveling to a place not desired for traveling on the map.

The invention claimed is:

1. A vacuum cleaner comprising:
   a main casing;
   a driving part for enabling the main casing to travel;
   a camera disposed on the main casing, for capturing an image in a side of traveling direction of the main casing;
   a distance calculator for calculating a distance to an object positioned in the side of traveling direction based on the image captured by the camera;
   a self-position estimator for calculating a position of the main casing based on the image captured by the camera;
   a mapper for generating a map of a traveling place by use of three-dimensional data based on calculation results by the distance calculator and the self-position estimator; and
   a controller for controlling an operation of the driving part based on the three-dimensional data of the map generated by the mapper, so as to make the main casing travel autonomously, wherein
   the mapper includes:
      a first mapper for generating a simple two-dimensional map of the traveling place for setting a traveling route along which the controller makes the main casing travel, based on two-dimensional arrangement position data of an object obtained through the calculation results by the distance calculator and the self-position estimator based on the image captured by the camera at a specified position; and
      a second mapper for additionally reflecting to the simple map the three-dimensional data including height data of an object obtained through the calculation results by the distance calculator and the self-position estimator based on the image captured by the camera when the main casing travels along the traveling route.

2. The vacuum cleaner according to claim 1, wherein the first mapper generates the simple map, based on the image captured by the camera while the controller controls the operation of the driving part so as to swing the main casing.

3. The vacuum cleaner according to claim 1, the vacuum cleaner comprising:
   a memory for storing map data.

4. The vacuum cleaner according to claim 1, the vacuum cleaner comprising:
   a data communicator for transmitting the map data via a network to a display terminal.

5. The vacuum cleaner according to claim 4, wherein the data communicator transmits and receives the map data via the network to a server connected to the network.

6. The vacuum cleaner according to claim 1, wherein the map data include three-dimensional data and traveling track data of the main casing.

7. The vacuum cleaner according to claim 6, the vacuum cleaner comprising:
   an unclean place estimator for estimating a place not having been cleaned based on the three-dimensional data and the traveling track data of the main casing.

8. The vacuum cleaner according to claim 7, wherein the camera captures an image of the place estimated by the unclean place estimator.

9. The vacuum cleaner according to claim 7, the vacuum cleaner comprising:
   an information transmitter for transmitting an estimation result by the unclean place estimator to a network by communication.

10. The vacuum cleaner according to claim 1, wherein the controller controls the operation of the driving part so as to make the main casing travel based on a control command transmitted from an external device.

11. The vacuum cleaner according to claim 10, wherein the control command includes travel control information to be used by the controller for controlling the operation of the driving part so as to make the main casing travel to a place desired for traveling on the map.

12. The vacuum cleaner according to claim 11, wherein the control command includes the travel control information to be used by the controller for controlling the operation of the driving part so as to prevent the main casing from traveling to a place not desired for traveling on the map.

13. A travel control method for a vacuum cleaner, comprising:
   capturing an image in a side of traveling direction of a main casing by a camera at a specified position;
   calculating a distance to an object positioned in the side of traveling direction based on the captured image and calculating a position of the main casing based on the captured image;
   generating a simple two-dimensional map based on two-dimensional arrangement position data of an object obtained through results of the calculating, and autonomous traveling along a traveling route set in the simple map;
   calculating a distance to an object positioned in the side of traveling direction based on the image in the side of traveling direction of the main casing captured by the camera while the autonomous traveling, and calculating a position of the main casing based on the captured image, additionally reflecting to the simple map three-dimensional data including height data of the object obtained through the calculation results, and autonomous traveling based on the map in which the three-dimensional data is reflected.

* * * * *